United States Patent [19]

Osborn et al.

[11] Patent Number: 4,486,225
[45] Date of Patent: Dec. 4, 1984

[54] PRODUCTION OF HIGHLY REFLECTIVE METAL FLAKE

[75] Inventors: Donald H. Osborn, Suffern; Richard J. Basley, Stony Point, both of N.Y.

[73] Assignee: MPD Technology Corporation, Wyckoff, N.J.

[21] Appl. No.: 386,050

[22] Filed: Jun. 7, 1982

[51] Int. Cl.$^3$ .............................................. B22F 9/00
[52] U.S. Cl. .................................. 75/0.5 R; 241/15; 241/17; 75/251
[58] Field of Search ............ 75/0.5 R, 0.5 A, 0.5 AA, 75/251–254; 241/15, 16, 17, 19, 20, 21; 106/290; 252/32.5; 142/120

[56] References Cited

U.S. PATENT DOCUMENTS

| | | | |
|---|---|---|---|
| 2,002,891 | 5/1935 | Hall | 106/290 |
| 3,181,962 | 5/1965 | Rolles | 106/290 |
| 3,244,542 | 4/1966 | Brown et al. | 106/277 |
| 3,709,439 | 1/1973 | Tundermann et al. | 241/15 |
| 3,776,473 | 12/1973 | Casey et al. | 241/15 |
| 3,901,688 | 8/1975 | Casey et al. | 75/0.5 R |
| 3,941,584 | 3/1976 | Tundermann et al. | 75/0.5 R |
| 3,963,482 | 6/1976 | Kondis | 75/0.5 R |
| 3,988,146 | 10/1976 | Kondis | 75/0.5 A |
| 3,995,815 | 12/1976 | Megelas | 241/15 |
| 4,065,060 | 12/1977 | Booz | 241/16 |
| 4,115,107 | 9/1978 | Booz et al. | 75/0.5 R |
| 4,172,720 | 10/1979 | Megelas | 75/251 |
| 4,186,244 | 1/1980 | Deffeyes et al. | 428/570 |
| 4,236,934 | 12/1980 | Bell | 106/290 |
| 4,273,583 | 6/1981 | Tyran | 75/251 |
| 4,289,534 | 9/1981 | Deffeyes et al. | 106/1.14 |
| 4,305,847 | 12/1981 | Stoetzer et al. | 252/512 |
| 4,318,747 | 3/1982 | Ishijima et al. | 106/290 |
| 4,382,981 | 5/1983 | Stoetzer et al. | 427/105 |

FOREIGN PATENT DOCUMENTS 2058845  4/1981  United Kingdom ........... 75/0.5 AA

OTHER PUBLICATIONS

S. J. Monte and G. Sugarman, "A New Generation of Age and Water Resistant Reinforced Plastics", 34th Annual Tech. Conf., Reinforced Plastics/Composites Inst., The Soc. of the Plastics Ind., Inc., Sc. 16–E, pp. 1–11, 1979.
Handbook of Ball Mill and Pebble Mill Operation, Paul O. Abbe Incorporated, Little Falls, NJ.
Reference Manual Supplement–1981, Reprinted from Modern Plastics, Aug. 1981.
KEN-REACT Reference Manual, Bulletin No. KR-0278-7, Rev. #2.

Primary Examiner—L. Dewayne Rutledge
Assistant Examiner—Christopher W. Brody
Attorney, Agent, or Firm—Raymond J. Kenny; Miriam W. Leff

[57] ABSTRACT

Metal flake of improved reflectivity is produced by a method comprising wet ball milling a metal powder in the presence of a lubricant comprising an organometallic compound.

15 Claims, No Drawings

PRODUCTION OF HIGHLY REFLECTIVE METAL FLAKE

TECHNICAL FIELD

The present invention relates to highly reflective metal flake and a process for producing such flake. More particularly, it relates to highly reflective nickel flake.

BACKGROUND OF THE INVENTION

There is a demand for highly reflective metal flake for many purposes, particularly in the production of paints, inks, and the like. One technique for producing metal flake involves a wet milling technique in which metal powder is ball milled in a low viscosity liquid, referred to herewith as a mobile liquid, the liquid eventually being driven off, e.g. by centrifuging and vacuum drying. The liquid is recovered and if in satisfactory form therefor it is reused. It is also known to incorporate a small amount of a lubricant such as fatty acids in the liquid medium to minimize or prevent welding of the particles being milled. U.S. Pat. Nos. 3,709,439 and 3,941,584, for example, disclose a method of making stain-resistant metals and alloys including nickel, which have smooth, specularly reflective surfaces, are bright and lustrous and are characterized by aesthetic effectiveness in paint films and other applications. U.S. Pat. Nos. 3,776,473 and 3,901,688 disclose a method for making highly reflective aluminum flake. Although these processes have been found very satisfactory for producing highly reflective metal flake, it would be an advantage to improve the reflectivity of the flake still further, e.g., for decorative purposes. Furthermore, it has been found that in the milling process there is a tendency to degeneration of the liquid medium, which limits its re-use and adds to the cost of processing.

It has now been found that with the use of a suitable lubricant in the mobile liquid system as a substitute for fatty acid lubricants, metal flake can be obtained which has improved reflectivity. It has also been found that with the lubricant of the present invention, the deterioration of the liquid medium is at least reduced considerably. Moreover, the flake is produced in accordance with this invention with high production efficiency and reproducibility.

These and other advantages of the present invention will become apparent from the description which follows taken in consideration with the examples. In this connection, it is noted that although the present invention is described herein with particular reference to nickel, the same principles apply to other conductive metals and alloys, as will be evident to those skilled in the art.

THE INVENTION

In accordance with the present invention metal flake with improved reflectivity is produced by a method comprising wet ball milling a metal powder in a mobile liquid system containing a small amount of lubricant, having dispersant properties, said lubricant comprising an organometallic compound, and said organometallic compound being at least partially soluble in the mobile liquid system. In an advantageous embodiment the organometallic compound serves also as a dispersing agent which minimizes welding of the metal particles as well as the agent which improves reflectivity. In a preferred embodiment in which the lubricant serves a dual purpose, the lubricant is an organometallic substituted alcohol. Preferred organometallic compounds are titanates, e.g., isopropyl tri(diactylpyrophosphato) titanate.

It is not known exactly how the organometallic compound of this invention serves to increase the reflectivity of the flake. However, it is believed that in addition to the organic portion of the organometallic compound being readily removed from the flake, the organometallic compound deposits a nonhydrated metallic oxide on the surface of the flake on which a monolayer of the oxide of the metal develops. The combined deposit of the metal oxide of the organometallic and monolayer of nonhydrated metal oxide developed during the milling operation form either a more stable oxide monolayer on the flake or a ceramic mixed metal oxide of improved reflectivity. Alternatively, the organometallic compound may contribute to developing a flake morphology during milling which exhibits improved reflectivity.

DETAILED DESCRIPTION OF THE INVENTION

1. Milling to Reflective Flake

The milling environment consists of the powder charge, the mobile liquid, the lubricant and the ball charge.

As noted above, the key feature of the present invention is the lubricant which is maintained in a small concentration in the mobile liquid environment in the mill during the milling step. In general, conventional lubricants have dispersant properties so as to minimize welding of the metal particles. Suitable lubricants in accordance with this invention comprise an organometallic compound, preferably a substituted alcohol, the organometallic compound being at least partially soluble in the mobile liquid environment and decomposable below the sintering temperature of the metal flake. In a preferred embodiment the organometallic compound also serves as the dispersant. preferably the compound is an organometallic having in the metal moiety comprising at least one element selected from a group of elements which has a different valence from the reflective metal being produced in the flake form. Exemplary of the metals contained in the metallic moiety are titanium, zirconium, tantalum, silicon, hafnium, vanadium, lithium, tin and lead. Exemplary of the organometallics is isopropyl tri(dioctylpyrophosphato) titanate.

The lubricant is present in the mill charge during milling in a small concentration, e.g. about 0.25% or less, e.g. 0.1% or even lower up to about 2, or 5 or 10% by weight of the metal charge. Preferably it is present in an amount of less than 1%. The least amount of lubricant should be used consistent with the desired properties, in keeping with the desire to avoid unnecessary build-up of lubricant coating on the flake. The actual amount of the lubricant required to be effective may be dependent, for example, upon the specific lubricant and the particular metal being milled. It is advantageous to make small periodic additions of lubricant during the mill run if necessary to replace that which is consumed by coating the flakes as they are formed and that which is lost during the operation.

It has been found that the present organometallic compound which may serve the dual function in the lubricant is not readily degraded, despite the heat generated in the mill, which is an advantage over fatty acids previously used. However, it is preferable that the mill be cooled during operation as by employing a water jacket about or spraying the outside of the mill with water.

It is essential in accordance with the invention that the milling action be conducted in a mobile liquid medium. Satisfactory mobile condition of the liquid medium is evidenced when the mill is discharged as by pouring out the entire contents of a ball mill, or removing one or more balls from the mill, and it is found that there is little or no coating of the balls by the powder charge. The mobile liquid is preferably mineral spirits (light liquid hydrocarbons usually having a specific gravity in the range of about 0.7 to 0.9), but may be water, isopropanol or other liquid of relatively low viscosity which may readily be removed from the flake product. Mixtures of mobile liquids may be employed. The liquid should wet the powder and the balls. In general, the mobile liquid is used in an amount to at least cover the balls. Typically, the mobile liquid and ball charge will occupy about 60% by volume of the mill, the liquid being about 5 cm (2 in) above the ball charge.

The metals to which the present invention applies are reflective metals and alloys. Exemplary of the metals that can be produced with improved reflectivity are: nickel, copper, cobalt, silver, gold, platinum group metals, aluminum, chromium, tin, and specularly reflective alloys thereof. Examples of alloys that can be produced in accordance with this invention are: Stainless steels, nickel alloys such as those described in aforementioned U.S. Pat. No. 3,709,439.

The initial powders can be made by any technique used to make metal powders. In carrying out the process of the invention, the starting material will normally be a metal powder usually having a fine particle size, for example, a size such as to pass a 100 mesh Tyler screen having openings measuring about 0.147 mm, preferably having a size such as to pass a 325 mesh Tyler screen (openings measuring 0.044 mm). Even finer starting metal powders are advantageous. In converting such powders to flake having aesthetic characteristics, individual powder particles are flattened between impacting grinding balls or between the balls and the wall of the container holding them. In general, it is more important to have small particle size initially with softer powders (compared to nickel) e.g. aluminum or silver powders. Some comminution of the powder results, and with coarser starting powders, more comminution is necessary to provide a flake product having the thinness, e.g., an average thickness less than about 1 $\mu$m, required for aesthetic uses, and to permit suspension in a liquid medium such as a paint.

The flake product provided in accordance with the invention are generally used in coating products. It is often desirable to apply the coating with a spray gun and it is important for the flake to be of such a size that it does not clog the spray gun. To satisfy this requirement the flake product will contain a major proportion of particles having an average thickness less than 1 $\mu$m and preferably less than about 0.75 $\mu$m or less than about 0.5 $\mu$m, with an average dimension across a major flake axis of about 10 to about 80 $\mu$ms, e.g., about 20 to about 40 $\mu$m. For special purposes, such as for use in plastics, etc., larger flakes may be desirable and can be achieved in accordance with the invention. Thus, flake products containing a major proportion of particles having an average dimension across a major flake axis exceeding 44 to 50 $\mu$m and up to, e.g., 150 $\mu$m, can be produced. For such products, it is preferred to start with metal or alloy powders in the size range passing 100 mesh but retained on a 325 mesh screen. Such larger flake products may be several microns, e.g., up to 5 $\mu$m, thick, since such products are intended for use in media which will accept heavier particles.

To obtain flake with suitable morphology for improved reflectivity, milling of the metal powder in the mobile liquid medium in the presence of a group of milling or grinding bodies confined in a milling space should be carried with the volume ratio of said liquid medium to said metal powder being at least about 10:1, and more preferably at least about 20:1, or even at least about 25:1, e.g., about 25:1 to about 50:1, and with said liquid medium being present in relation to the volume of said milling or grinding bodies such that the interstitial space between said grinding bodies at rest in the confined milling space in substantially completely filled with said liquid medium. Lower liquid to powder ratios may be employed but the risk of producing roughened surfaces of lower specular brightness on the flake product is thereby increased. Higher liquid to powder ratios may be employed but production rate is thereby lowered, which is undesirable economically, and other detrimental effects may be encountered.

As noted in the aforementioned U.S. Patents, the milling can be conducted in a conventional ball mill or in an attritor mill or in other types of grinding or milling equipment, e.g., vibratory and planetary ball mills, and the term "ball mill" is used generically herein to include mills wherein a charge of grinding balls or otherwise shaped grinding media is confined in a container therefor. While the milling action itself can vary depending upon the particular equipment involved, nevertheless the teachings herein are applicable and enable the production of satisfactory flake products from stain-resistant and other specularly reflective metals.

The Conventional Ball Mill

For practical purposes, the conventional ball mill forms a convenient apparatus in relation to the present invention. As is known, the mill comprises a hollow cylindrical container or shell in which a charge of grinding balls, preferably substantially uniform in size and preferably substantially spherical in shape is placed. Usually the volume of the ball charge including the free space therebetween will occupy less than half of the volume of the mill, and when at rest the mobile liquid will at least cover the balls. The mill is rotated about its cylindrical axis at a rotational speed sufficient to create a cascading and impacting or impinging action in the ball charge. It is desirable to provide a number of lifters fastened to the inner cylindrical wall parallel to the cylindrical axis and extending along the length of the mill so as to reduce slippage of the ball charge against the inner cylindrical mill wall. The effective impacting action of the balls which produces flake occurs in only a limited zone, i.e., the charge zone within which the cascading action of the balls occurs. As the balls are lifted due to rotation of the mill, the mobile liquid is believed to drain therefrom so that most of the liquid and most of the powder being acted upon remains in the lower portion of the mill and is available in the active zone. The mill is operated with high ball to powder volume ratios, e.g. 25:1 or 30:1 and higher.

The Attritor Mill (Stirred Ball Mill)

This mill is considered to be substantially more active in relation to grinding than the ball mill. The mill comprises an axially vertical stationary cylinder having a rotatable agitator shaft located coaxially of the mill with spaced agitator arms extending substantially horizontally from the shaft. The mill is filled with grinding elements, preferably metal, e.g., steel balls, usually of substantially uniform size, sufficient to bury at least some of the horizontal arms so that, when the agitator shaft is rotated, the ball charge, by virtue of the arms passing through it, is maintained in a continual state of unrest or relative motion through the bulk thereof during milling. In operating the attritor mill in accordance with the invention the mill tank is filled with balls to about one or two ball diameters in height above the topmost horizontal agitator arm and the entire free space within the ball charge is filled with the mobile liquid such that the liquid covers the top of the ball charge at rest. The entire ball charge within the attritor mill is considered to be active due to the motion of the agitator arms therethrough when the mill is in operation. The attritor preferably is run at high speed to reduce operational time, and with a high ball to powder volume ratio, e.g., about 25:1 or 30:1 or higher.

Processing of the Flake

The flake after discharge from the mill is separated from the liquid by any technique used for liquid/solid separation. It may be used as a paste or dried.

The drying treatment is mainly to remove the mobile liquid. Drying may be carried out in a drying oven, e.g., at about 90° C. for the period of time required to remove all or substantially all of the mobile liquid. This is referred to in the examples below as the "as dried" condition. On a commercial scale a more practical approach for drying is treatment under a slight vacuum at a more elevated temperature, e.g., in the range of about 80° C. to 200° C. (~180° F. to 400° F.), e.g., about 150° C. (300° F.) and cooling under vacuum.

The following examples are given in order to give those skilled in the art a better appreciation of the advantages of the invention. In the examples the main tests carried out are for specular reflectance, particle size and specular reflectance. Specular reflectance is determined on the as dried flake. Specular reflectance is determined by a test comprising forming a water-floated layer of the flake sample to be measured, aiming a light beam of parallel rays, at an angle of 30° from the vertical, generated by a tungsten filament light source and measuring the specularly reflected light ($R_s$) from the beam by means of photocell sensitive in the range of 300 to 700 μm wavelength. The test is nonstandard, but is comparative. It is affected to an extent by the absorption characteristics of the material tested and the photocell can report light values at wavelengths which are outside the visible spectrum. The test forms a useful indication of the surface smoothness of metal flake.

EXAMPLE I

This example shows the effect of milling time in a process carried out in accordance with the present invention.

In this example, a ball mill is employed which is approximately 91.5 cm (36 in) in diameter, 30.5 cm (12 in) long and is provided with 15 internal lifters about 3.8 cm wide × 2.5 cm high (1½ in wide × 1 in high) fastened at 24° spacings over the full cylindrical face of the mill parallel to the cylindrical axis. The mill is charged with 272.2 kilograms (600 lbs) of 0.64 cm (¼ in) diameter steel balls, 7.7 kilograms (17 lbs) of carbonyl nickel powder of about 2.2 to about 3 μm average size, 34.1 liters (9 gallons) of 66/3 mineral spirits (a light liquid hydrocarbon Mineral Spirits similar in viscosity to kerosene and having a specific gravity of about 0.771), and 18.2 grams of isopropyl tri(dioctylpyrophosphato) titanate. The ball to liquid volume ratio is 1.02:1, the ball to powder volume ratio is 40:1 and the liquid to powder volume ratio is 39.3 to 1. The mill is rotated at 27 rpm. Samples are obtained for various milling periods from ½ to 2 hours. Each sample is discharged, and following a liquid/solid separation the flake is dried at 149° C. (300° F.) using a vacuum of 30 in of mercury, then flushed with a nonoxidizing atmosphere for 30 minutes and allowed to cool under vacuum. Particle size, average thickness (T) and specular reflectance ($R_s$) of the flake were determined. Optical observations showed that the flake was bright and lustrous.

Typical data obtained are shown in TABLE I.

TABLE I

| Milling Time hrs | Size - Microns* | | | T** μm | $R_s$** % |
|---|---|---|---|---|---|
| | −44 | −61 +44 Wt. % | +61 | | |
| 0.5 | 96.7 | 1.4 | 1.9 | 1.25 | 26.3 |
| 1.0 | 95.1 | 3.6 | 1.3 | 1.0 | 30.2 |
| 1.5 | 93.7 | 5.6 | 0.7 | 0.8 | 39.3 |
| 2.0 | 95.0 | 4.5 | 0.5 | 0.67 | 42.7 |

*Determined by a dry screening technique.
**Determined on product screened through a screen having 44 μm openings.

The results in Table I show the effect of milling on particle size, thickness and specular reflectance. Reflectivity increased with time, while the thickness of the flake decreased. The product produced in a milling time of 1.5 hours, for example, yielded 93.7% by weight fewer than 44 μm in size, and it has a specular reflectance greater than 39%, viz. 39.3%.

EXAMPLE II

This example shows the effect of lubricant in a process carried out in accordance with the present invention.

In this example, a ball mill is employed which is 30.5 cm (12 in) in diameter, 12.7 cm (5 in) long and is provided with 4 internal lifters 1.3 cm (½") square fastened at 90° spacings over the full cylindrical face of the mill parallel to the cylindrical axis. The mill is charged with 750 grams of −400 mesh atomized Type 316L stainless steel powder, 0.64 cm (¼ in) diameter steel balls, 2000 milliliters of 66/3 mineral spirits (a light liquid hydrocarbon Mineral Spirits similar in viscosity to kerosene and having a specific gravity of about 0.771) and 2.0 grams of isopropyl tri(di-octylpyrophosphato) titanate. The mill is rotated for 18 hours at 45 rpm, with further additions of titanate being made after 14 hours running time. The ball to liquid volume ratio is 0.95:1, the ball to powder volume ratio is 20.4:1 and the liquid to powder volume ratio is 21.3:1. At the end of the run the mill is discharged, the flake product separated from the liquid by decantation, and vacuum dried at about 105° C. (220° F.) using a vacuum of 254 mm (30 in) of Hg. Average thickness (T) and specular reflectance $R_s$ were determined with the results set forth in Table II. Optical examination indicated that the flake product is bright and lustrous and is satisfactory for use in aesthetic applications such as automotive finishes.

TABLE II

| Sample | Size - μm* | | | T** | $R_s$** |
| --- | --- | --- | --- | --- | --- |
| | −44 | −61 +44 | +61 | μm | % |
| | Wt. % | | | | |
| S/S | 47.6 | 33.5 | 18.9 | 0.8 | 57.5 |

*Determined by a dry screening technique.
**Determined on product screened through a screen having 44 micron openings. The thickness measurements were calculated from water coverage measurements for which the value used was for square centimeters per gram.

EXAMPLE III

The purpose of this example is to show the effect of the lubricant on the reflectivity of flake produced in a wet milling process.

Part A

Three samples of nickel flake are produced using essentially the same processing conditions as described in Example I, except that all samples are processed for one hour and in each sample a different lubricant is used, viz. oleic acid (A), cetyl alcohol (B) and isopropyl tri(dioctylpyrophosphato) titanate (C). The samples are examined "as dried" (at 90° C. for one hour in a vacuum oven) to remove mineral spirits. Particle size, average thickness (T), specular reflectance (Rs), particle size and resistivity data are shown in Table III, which also shows the specific lubricant used in the milling medium.

TABLE III

| Lubricant | Milling Time Min. | Size - μm | | | T | $R_s$ |
| --- | --- | --- | --- | --- | --- | --- |
| | | −44 | −61 +44 | +61 | μm | % |
| | | Wt. % | | | | |
| A | 50-70 | 99.8 | 0.2 | 0.0 | 1.6 | 27.5 |
| B | 60 | 98.1 | 1.7 | 0.2 | 1.1 | 25.7 |
| C | 60 | 95.1 | 3.6 | 1.3 | 1.0 | 30.2 |

Part B

Three samples of stainless steel flake are produced using essentially the same processing conditions as described in Example II, except that all samples are processed for approximately 18 hours and in each sample a different lubricant is used viz. stearic acid (F), cetyl alcohol (B) and isopropyl tri(dioctylpyrophosphato) titanate (C). The samples were examined "as dried" to remove mineral spirits. Particle size, average thickness (T), and specular reflectance ($R_s$) are shown in TABLE IV, which also shows the specific lubricant used in the milling medium.

TABLE IV

| Lubricant | Size - μm* | | | T** | $R_s$ |
| --- | --- | --- | --- | --- | --- |
| | −44 | −61 +44 | +61 | μm | % |
| | Wt. % | | | | |
| F | 68.2 | 11.6 | 20.2 | 0.7 | 40.7 |
| B | 80.1 | 15.0 | 4.9 | 0.8 | 52.5 |
| C | 47.6 | 33.5 | 18.9 | 0.8 | 57.7 |

*Determined by dry screening techniques.
**Determined on product screened through a screen having 44 micron openings.

The results in Tables III and IV show that in the as dried condition there is connsiderable improvement in reflectivity for the nickel and stainless steel flake prepared with the titanate of this invention compared to flake prepared with other lubricants. The results also show that stainless steel flake, for example, can be produced in only 18 hours milling time with a specular reflectance greater than about 53%, viz. about 57.7%.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process for producing metal flake having improved reflectivity comprising wet ball milling a powder of the metal in a mobile liquid system containing a small amount of lubricant having dispersant properties to minimize welding of the metal particles, said lubricant comprising an organometallic compound being an organometallic substituted alcohol, said organometallic compound being at least partially soluble in the mobile liquid system.

2. A process according to claim 1, wherein the metal flake is metal selected from group nickel, copper, cobalt, aluminum, chromium, tin, silver, gold and alloys of such metals.

3. A process according to claim 1, wherein the reflective metal comprises nickel and nickel alloys.

4. A process according to claim 1, wherein the reflective metal comprises stainless steel.

5. A process according to claim 1, wherein the metal containing moiety of the organometallic substituted alcohol comprises a metal selected from a group having a different valence from the valence of the metal used to produce flake.

6. A process according to claim 1, wherein the metal-containing moiety of the organometallic substituted alcohol comprises at least one of the metals selected from the group consisting of titanium, zirconium, hafnium, tantalum, vanadium, silicon, lithium, tin and lead.

7. A process according to claim 1, wherein the metal conaining moiety of the organometallic substituted alcohol comprises titanium.

8. A process according to claim 1, wherein the lubricant comprises isopropyl tri(dioctylpyrophosphato) titanate.

9. A process according to claim 1, wherein the organometallic substituted alcohol is a titanate.

10. A process according to claim 1, wherein the lubricant is isopropyl tri(dioctylpyrophosphato) titanate.

11. A process according to claim 1, wherein the lubricant is present in an amount of about 0.1% to about 10%.

12. A process of claim 1, wherein the metal flake produced by wet ball milling is dried by a method which comprises subjecting the flake to a temperature in the range of about 80° C. to 200° C. under a vacuum until the mobile liquid is removed.

13. A process of claim 1, wherein the reflective flake is nickel and the lubricant is an organometallic titanate.

14. A process of claim 1, wherein the reflective flake is stainless steel and the lubricant is an organometallic titanate.

15. A process for producing metal flake having improved reflectivity comprising wet ball milling a powder of the metal in a mobile liquid system containing a small amount of lubricant having dispersant properties to minimize welding of the metal particles, said lubricant comprising isopropyl tri(dioctylpyrophosphato) titanate.

* * * * *